United States Patent
Kuroda et al.

(10) Patent No.: US 9,561,688 B2
(45) Date of Patent: Feb. 7, 2017

(54) PNEUMATIC TIRE

(71) Applicant: Sumitomo Rubber Industries, Ltd., Kobe-shi, Hyogo (JP)

(72) Inventors: Keita Kuroda, Kobe (JP); Yosuke Matsuda, Kobe (JP); Hiroaki Ninomiya, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 374 days.

(21) Appl. No.: 14/153,139

(22) Filed: Jan. 13, 2014

(65) Prior Publication Data

US 2014/0209225 A1    Jul. 31, 2014

(30) Foreign Application Priority Data

Jan. 28, 2013 (JP) ................................ 2013-013557
Jun. 3, 2013 (JP) ................................ 2013-117157

(51) Int. Cl.
*B60C 11/03* (2006.01)
*B60C 11/12* (2006.01)

(52) U.S. Cl.
CPC ........ *B60C 11/0309* (2013.04); *B60C 11/0306* (2013.04); *B60C 11/1236* (2013.04); *B60C 2011/0346* (2013.04); *B60C 2011/0348* (2013.04); *B60C 2011/0365* (2013.04); *B60C 2011/0372* (2013.04); *B60C 2011/0381* (2013.04); *B60C 2011/1209* (2013.04); *B60C 2011/1213* (2013.04); *B60C 2011/1245* (2013.04)

(58) Field of Classification Search
CPC ............. B60C 11/0306; B60C 11/0309; B60C 2011/0358; B60C 2011/0341; B60C 2011/0353; B60C 2011/0365; B60C 2011/0372; B60C 2011/0374; B60C 2011/0376; B60C 2011/0381; B60C 2011/0383; B60C 2011/0388; B60C 2200/04; B60C 2011/0346; B60C 2011/0348
USPC ................. 152/209.18, 209.27, 209.16, 902
See application file for complete search history.

(56) References Cited

U.S. PATENT DOCUMENTS

| | | | | |
|---|---|---|---|---|
| 5,135,038 | A * | 8/1992 | Graas | ................. B60C 11/0306 152/209.18 |
| 2009/0188596 | A1* | 7/2009 | Kojima | ............... B60C 11/0309 152/209.8 |
| 2009/0277550 | A1 | 11/2009 | Ikeda | |

(Continued)

OTHER PUBLICATIONS

Extended European Search Report dated May 8, 2014, for European Application No. 14150369.8.

*Primary Examiner* — Eric Hug
(74) *Attorney, Agent, or Firm* — Birch, Stewart, Kolasch & Birch, LLP

(57) ABSTRACT

A pneumatic tire has a tread portion provided with two crown main groove and two shoulder main grooves and divided into a center land zone, two middle land zones and two shoulder land zones. The middle land zone is provided with middle auxiliary grooves. The shoulder land zone is provided with shoulder axial grooves. The width of the shoulder axial groove at the axially outer end is more than the width of the shoulder axial groove at the axially inner end. Through the shoulder main groove, the shoulder axial grooves are continued to the respective middle auxiliary grooves.

8 Claims, 6 Drawing Sheets

(56) References Cited

U.S. PATENT DOCUMENTS

| | | | | |
|---|---|---|---|---|
| 2011/0162770 A1* | 7/2011 | Yamakawa | ......... | B60C 11/0302 152/209.18 |
| 2012/0267022 A1* | 10/2012 | Tagashira | ............ | B60C 11/0309 152/209.25 |
| 2013/0068360 A1* | 3/2013 | Tamugi | ............... | B60C 11/0306 152/209.18 |
| 2014/0137999 A1* | 5/2014 | Nishiwaki | ........... | B60C 11/0309 152/209.8 |
| 2014/0230979 A1* | 8/2014 | Matsuda | ................. | B60C 11/12 152/209.18 |
| 2014/0230982 A1* | 8/2014 | Ninomiya | ........... | B60C 11/0306 152/209.22 |
| 2014/0238567 A1* | 8/2014 | Iwasaki | ............... | B60C 11/0306 152/209.18 |

* cited by examiner

PNEUMATIC TIRE

BACKGROUND OF THE INVENTION

The present invention relates to a pneumatic tire, more particularly to a tread pattern suitable for a winter tire and capable of improving running performance on snowy roads and running performance on icy roads in a good balance.

Winter tires or pneumatic tires for the winter season are required to have running performance on snowy roads (hereinafter, snow performance) and running performance on icy roads (hereinafter, ice performance) which are improved in a good balance at high levels.

For instance, in order to improve ice performance by increasing the ground contacting area of the tread, if the widths of tread grooves are decreased, then, during running on snowy roads, shearing force of snow packed into the tread grooves is decreased, and snow performance is deteriorated. Thus, it is difficult to improve snow performance and icy performance in a good balance at high levels.

Japanese Patent Application Publication No. JP-A-2009-269500, directed to improve snow performance and icy performance of a pneumatic tire in a good balance, teaches to specifically define the widths of five land zones which are axially divided by four circumferentially-continuously-extending main grooves, to form each land zone as a row of blocks, and to provide a circumferentially-continuously-extending narrow groove for each of the middle land zones. However, there is room for improvement on such pneumatic tire.

SUMMARY OF THE INVENTION

It is therefore, an object of the present invention to provide a pneumatic tire in which, by specifically configuring tread grooves disposed in middle land zones and shoulder land zones of the tread portion, snow performance and ice performance can be improved at the same time in a good balance.

According to the present invention, a pneumatic tire comprises a tread portion provided on each side of the tire equator with a crown main groove and a shoulder main groove extending continuously in the tire circumferential direction, so that the tread portion is axially divided into a center land zone between the crown main grooves, a pair of middle land zones between the crown main grooves and the shoulder main grooves, and a pair of shoulder land zones axially outside the shoulder main grooves, wherein the middle land zones are each provided with a plurality of middle auxiliary grooves extending axially inwardly from the shoulder main groove and terminating within the middle land zone, the shoulder land zones are each provided with a plurality of shoulder axial grooves extending axially outwardly from the shoulder main groove, the width of the shoulder axial groove measured at the axially outer end is larger than the width of the shoulder axial groove measured at the axially inner end, and the axially inner ends of the shoulder axial grooves are respectively overlapped with the axially outer ends of the middle auxiliary grooves at least partially in the tire circumferential direction.

Therefore, the middle auxiliary grooves increase the shearing force of packed snow in order to improve snow performance and at the same time maintain the ground contacting area of an axially inside part of the middle land zone in order to improve ice performance.

The shoulder axial grooves relatively increase the ground contacting area in an axially inside part of the shoulder land zone than in an axially outside part in order to improve ice performance.

Further, such shoulder axial grooves increase the groove volume in the axially outside part of the shoulder land zone and thereby the shearing force of packed snow is increased in order to improve snow performance.

Further, as the middle auxiliary grooves continue to the shoulder axial grooves through the shoulder main groove, during running on snowy roads, packed snow continuously extends in the shoulder axial grooves, middle auxiliary grooves and the shoulder main groove. Accordingly, the shearing force can be increased and snow performance can be improved.

The pneumatic tire according to the present invention may be further provided with the following features:

(1) the shoulder axial groove comprises a first portion extending axially outwardly from the shoulder main groove, and a second portion extending axially outwardly from the first portion with a groove width more than the groove width of the first portion;

(2) the shoulder axial groove comprises a third portion to which the axially outer end of the second portion is connected and which has a groove width more than that of the second portion;

(3) each of the shoulder land zones comprises shoulder blocks divided by the shoulder axial grooves, the groove width W1 of the first portion is 0.10 to 0.30 times the maximum circumferential length of the shoulder block, and the groove width W2 of the second portion is 0.17 to 0.33 times the maximum circumferential length of the shoulder block;

(4) the ratio W2/W1 of the groove width W2 of the second portion to the groove width W1 of the first portion is in a range of not less than 1.10, but not more than 1.70;

(5) the first portion is inclined with respect to the tire axial direction, and the second portion is parallel with the tire axial direction;

(6) the first portion is inclined at an angle of from 5 to 25 degrees with respect to the tire axial direction;

(7) each of the shoulder land zones is provided with a plurality of shoulder narrow grooves each extending from the junction between the first portion and the second portion of one of the shoulder narrow grooves to the junction of the adjacent shoulder narrow groove with a groove width less than the shoulder main groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/ Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges are the axial outermost edges of the ground contacting patch of the tire (camber angle=0) in the normally inflated loaded condition.

The tread width is the axial distance between the tread edges measured in the normally inflated unloaded condition of the tire.

DESCRIPTION OF THE PREFERRED EMBODIMENTS

Figure 1:
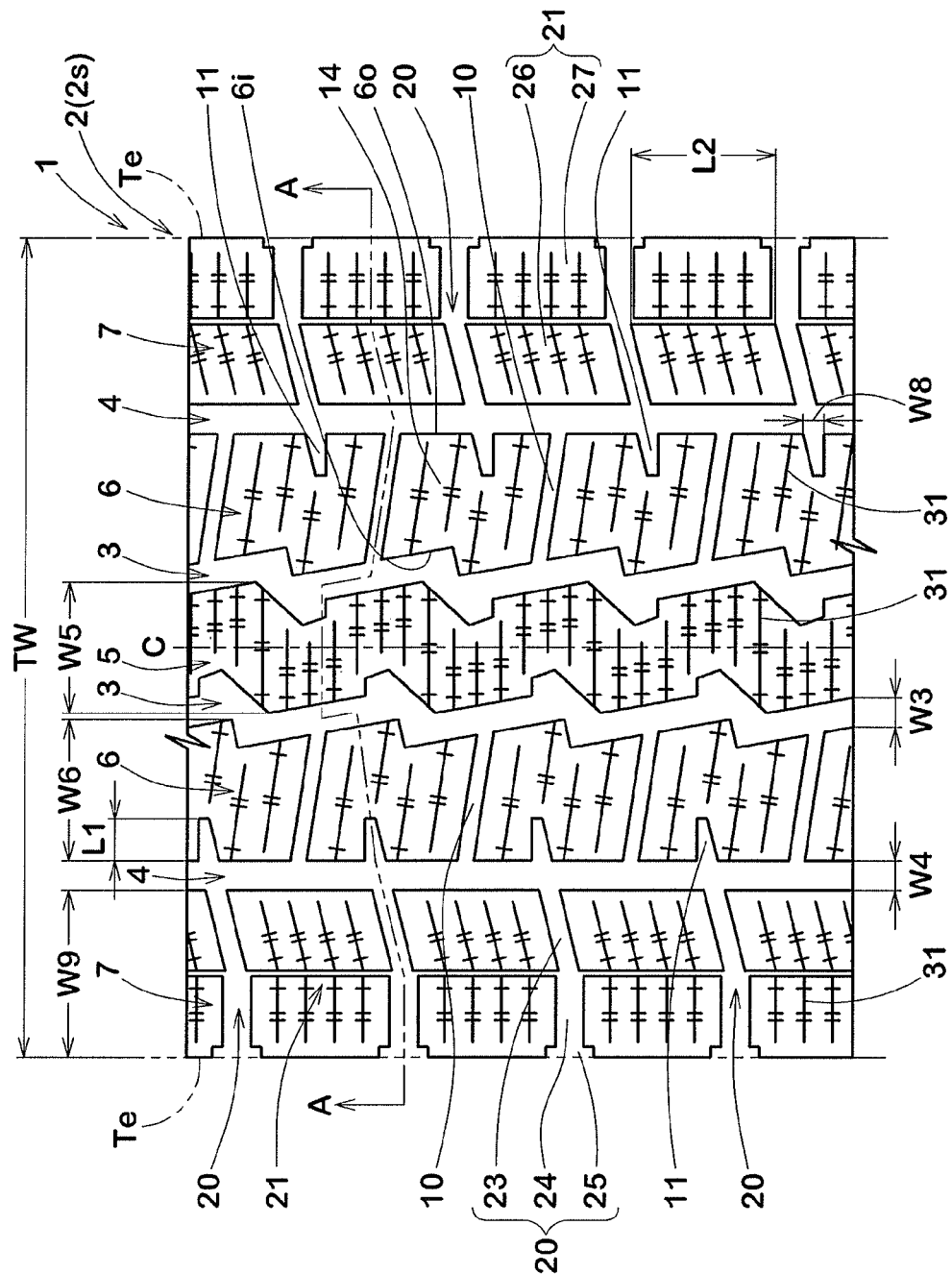
FIG. 1 is a developed partial view of the tread portion of a pneumatic tire as an embodiment of the present invention.
Figure 2:
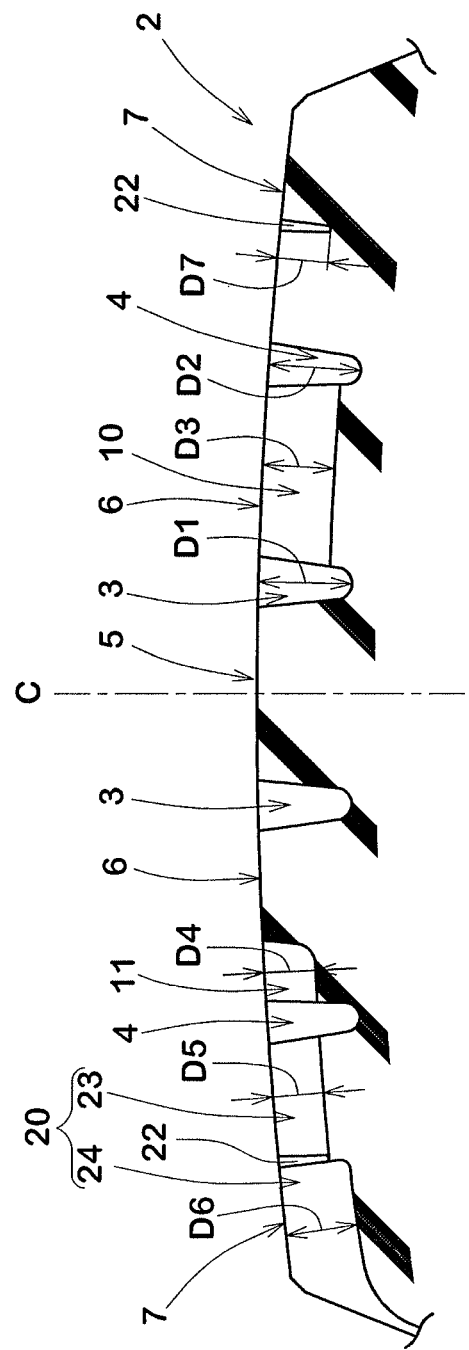
FIG. 2 is a cross sectional view of the tread portion taken along line A-A of FIG. 1.

Embodiments of the present invention will now be described in detail in conjunction with the accompanying drawings.

Pneumatic tire 1 according to the present invention comprises, as usual, a tread portion 2, a pair of axially spaced bead portions each with a bead core therein, a pair of sidewall portions extending between the tread edges Te and the bead portions, a carcass extending between the bead portions, and a tread reinforcing belt disposed radially outside the carcass in the tread portion.

The tread portion 2 is provided with circumferentially continuously extending main grooves 3 and 4 which are a pair of crown main grooves 3 disposed one on each side of the tire equator C, and a pair of shoulder main grooves 4 disposed axially outside the respective crown main grooves 3.

The crown main groove 3 in this example is a zigzag groove. For example, the width W3 of the crown main groove 3 is set in a range of from 2.0 to 6.0% of the tread width TW in order to improve wet performance during running in wet conditions by effectively draining water existing between the tread 2s and the road surface.

The shoulder main groove 4 in this example is a straight groove whose each edge extends along a straight line parallel width the tire equator. For example, the width W4 of the shoulder main groove 4 is set in a range of from 2.0 to 6.0% of the tread width TW in order to increase the shearing force of snow packed into the groove during running on snowy roads, in particular, to improve the cornering performance on snowy roads.

Preferably, the depth D1 of the crown main groove 3 and the depth D2 of the shoulder main groove 4 are set in a range of from 10 to 15 mm in order to increase the wet performance, snow performance and steering stability.

By the above-mentioned four main grooves 3 and 4, the tread portion 2 is axially divided into five land zones, namely, a center land zone 5 between the two main grooves 3, a pair of middle land zones 6 between the main grooves 3 and the main grooves 4, and a pair of shoulder land zones 7 between the main grooves 4 and the tread edges Te.

The center land zone 5 in this example extends zigzag.

The center land zone 5 is provided with sipes 31 defined as having a width of 0.5 to 1.0 mm.

The center land zone 5 is provided with no grooves other than the sipes 31. Thus, the center land zone 5 extends substantially continuously in the tire circumferential direction, therefore, this portion may be considered as a rib.

For example, the maximum axial width W5 of the center land zone 5 is set in a range of from 0.14 to 0.18 times the tread width TW in order to increase the rigidity and thereby improve the steering stability during running on dry roads.

The middle land zones 6 are each provided with middle axial grooves 10 arranged circumferentially of the tire at intervals, and thereby the middle land zone 6 is circumferentially divided into middle blocks 14 in a circumferential row.

The middle land zone 6 has an axially inner edge 6i circumferentially extending zigzag and an axially outer edge 6o circumferentially extending straight. For example, the maximum axial width W6 of the middle land zone 6 is set in a range of from 0.15 to 0.20 times the tread width TW.

The middle land zone 6 is provided with middle axial grooves 10 and middle auxiliary grooves 11 arranged alternately in the circumferential direction at intervals.

The middle axial groove 10 is connected to the adjacent main grooves 3 and 4.

The middle axial groove 10 is inclined with respect to the tire axial direction. For example, the inclination angle θ1 of the middle axial groove 10 is set in a range of from 5 to 10 degrees with respect to the tire axial direction.

For example, the width W7 of the middle axial groove 10 is substantially constant.

For example, the width W7 of the middle axial groove 10 is set in a range of from 0.40 to 0.50 times the width W4 of the shoulder main groove 4.

For example, the depth D3 of the middle axial groove 10 is preferably set in a range of not less than 0.70 times, more preferably not less than 0.73 times, but not more than 0.80 times, more preferably not more than 0.77 times the depth D2 of the shoulder main groove 4 in order to improve the wet performance without sacrificing the rigidity of the tread portion 2.

The above-mentioned middle auxiliary grooves 11 each have an axially outer end 12 connected to the shoulder main groove 4, and an axially inner end 13 terminating within the middle land zone 6.

Such middle auxiliary grooves 11 can maintain the ground contacting area of the middle land zone 6 in its axially inside part in order to improve ice performance, and at the same time, can increase the shearing force of packed snow in order to improve snow performance.

It is preferable that the width W8 of the middle auxiliary groove 11 is gradually increased from the axial inside toward the axially outside of the tire in order that snow is effectively packed tight during cornering and thereby improve the shearing force.

If the width W8 of the middle auxiliary groove 11 is large, the rigidity of the middle land zone 6 decreases, and there is a possibility that the steering stability on icy roads deteriorates. If the width W8 of the middle auxiliary groove 11 is small, there is a possibility that the shearing force of packed snow is not increased. Therefore, the width W8 of the middle auxiliary groove 11 is preferably set in a range of not less than 0.40 times, more preferably not less than 0.45 times, but not more than 0.60 times, more preferably not more than 0.55 times the width W4 of the shoulder main groove 4.

For similar reasons, the axial length L1 of the middle auxiliary groove 11 is preferably set in a range of not less than 0.25 times, more preferably not less than 0.28 times, but not more than 0.35 times, more preferably not more than 0.32 times the maximum width W6 of the middle land zone 6.

Thus, the middle auxiliary grooves 11 can increase the shearing force of packed snow, while maintaining the rigidity of the middle land zone 6, and it becomes possible to improve the snow performance and ice performance in a good balance.

Preferably, the widthwise center line 11c of the middle auxiliary groove 11 is inclined with respect to the tire axial direction in order that the middle auxiliary groove 11 can exert its edge effect in multi-directions to thereby improve the steering stability on icy roads and snowy roads.

The angle η2 of the widthwise center line 11c of the middle auxiliary groove 11 is preferably set in a range of not less than 3 degrees, more preferably not less than 5 degrees, but not more than 10 degrees, more preferably not more than 8 degrees with respect to the tire axial direction.

For example, in order to increase the shearing force of packed snow while maintaining the rigidity of the middle land zone 6, the depth D4 of the middle auxiliary groove 11 is preferably set in a range of not less than 0.45 times, more preferably not less than 0.50 times, but not more than 0.60 times, more preferably not more than 0.55 times the depth D2 of the shoulder main groove 4.

Figure 3:
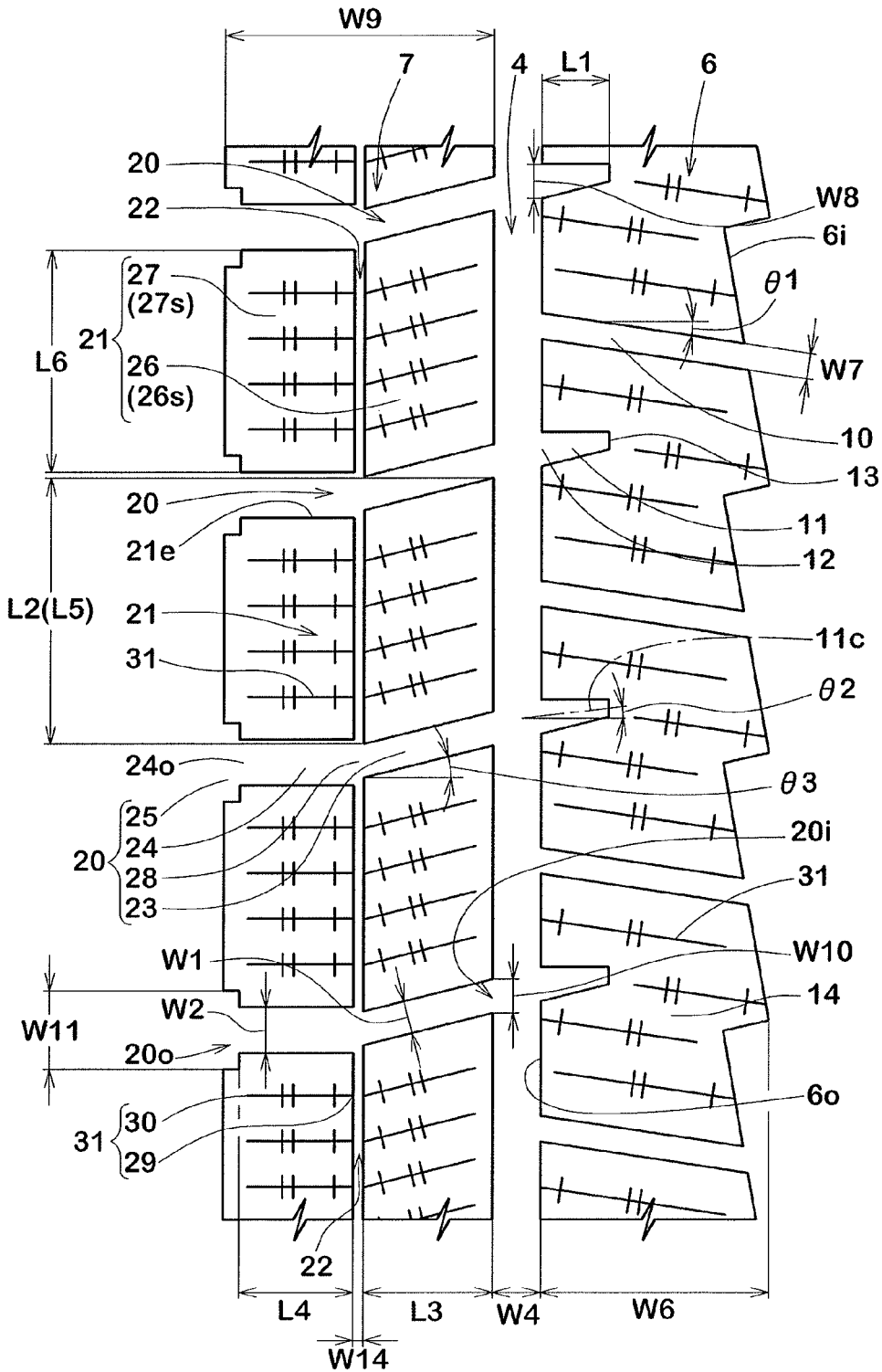
FIG. 3 is a partial view of the tread portion showing a part of a middle land zone and a part of a shoulder land zone.

The shoulder land zone 7 is, as shown in FIG. 3, formed as a row of circumferentially arranged shoulder blocks 21 divided by shoulder axial grooves 20 arranged circumferentially of the tire at intervals. In this example, the width W9 of the shoulder land zone 7 is substantially constant. For example, the width W9 of the shoulder land zone 7 is set in a range of from 0.13 to 0.20 times the tread width TW.

In addition to the shoulder axial grooves 20, the shoulder land zone 7 is further provided with shoulder narrow grooves 22 each connected to the circumferentially adjacent shoulder axial grooves 20.

The shoulder axial groove 20 has an axially inner end 20i connected to the shoulder main groove 4, and an axially outer end 20o opened at the tread edge Te, and the groove width W11 at the axially outer end 20o is larger than the groove width W10 at the axially inner end 20i.

Such shoulder axial grooves 20 relatively increase the ground contacting area of the shoulder land zone 7 in its axially inside part where the ground pressure is relatively high, therefore, the friction of the shoulder land zone 7 increases and ice performance is improved. Further, the shoulder axial grooves 20 relatively increases the groove volume in an axially outside part of the shoulder land zone 7 where the ground pressure is relatively low, therefore, the decrease in the frictional force of the shoulder land zone 7 can be minimized and the shearing force of packed snow is increased to improve snow performance.

As shown, the middle auxiliary grooves 11 continue to the respective shoulder axial grooves 20 through the shoulder main groove 4. In other words, their opposite ends are aligned so that, in the tire circumferential direction, the axially inner end 20i of the shoulder axial groove 20 is at least partially overlapped with the axially outer end 12 of the middle auxiliary groove 11. Therefore, during running on snowy roads, snow packed into the middle auxiliary grooves 11 and the shoulder axial grooves 20 extends continuously long in the tire axial direction, and accordingly, a larger shearing force can be obtained to improve snow performance.

The shoulder axial groove 20 comprises a first portion 23 extending axially outwardly from the shoulder main groove 4, and a second portion 24 extending axially outwardly from the first portion 23 and having a groove width W2 more than the groove width W1 of the first portion 23.

The first portion 23 extends straight and is inclined with respect to the tire axial direction. The angle θ3 of the first portion 23 is preferably set in a range of not less than 5 degrees, more preferably not less than 10 degrees, but not more than 25 degrees, more preferably not more than 20 degrees with respect to the tire axial direction in order that the edge effect is exerted in the tire circumferential direction and axial direction to improve the steering stability on icy roads.

In this example, the width W1 of the first portion 23 is substantially constant. But, it is also possible to increase the groove width W1 gradually from the axially inside toward the outside in order to effectively discharge water toward the axially outside.

If the groove width W1 of the first portion 23 is small, the shearing force of packed snow decreases and it becomes difficult to improve the snow performance. If the groove width W1 of the first portion 23 is large, the ground contacting area of the shoulder land zone 7 decreases and it becomes difficult to improve the ice performance. Therefore, the groove width W1 of the first portion 23 is preferably set in a range of not less than 0.10 times, more preferably not less than 0.15 times, but not more than 0.30 times, more preferably not more than 0.17 times the maximum circumferential length L2 of the shoulder block 21.

For similar reasons, the axial length L3 of the first portion 23 is preferably set in a range of not less than 0.40 times, more preferably not less than 0.45 times, but not more than 0.60 times, more preferably not more than 0.55 times the width W9 of the shoulder land zone 7 in order that the edge effect is exerted in the tire circumferential direction and axial direction in a good balance to improve the steering stability on icy roads especially.

It is preferable that the groove depth D5 of the first portion 23 is set in a range of not less than 0.45 times, more preferably not less than 0.50 times, but not more than 0.60 times, more preferably not more than 0.55 times the depth D2 of the shoulder main groove 4, and the groove depth D5 of the first portion 23 is preferably equal to the depth D4 of the middle auxiliary groove 11 in order to increase the shearing force of packed snow, while maintaining the rigidity of the shoulder land zone 7.

The second portion 24 extends straight as shown in FIG. 3. In this example, the second portion 24 is parallel with the tire axial direction in order to increase the shearing force of packed snow in the tire circumferential direction and improve the steering stability on snowy roads.

In this example, the groove width W2 of the second portion 24 is substantially constant. But, it is also possible to gradually increase the groove width W2 from the axially inside towards the outside in order that the shearing force of packed snow is increased toward the axially outside and to thereby improve the cornering performance on snowy roads. In order to improve the running performance on snowy roads and the cornering performance on dry roads, the groove width W2 of the second portion 24 is preferably set in a range of not less than 0.17 times, more preferably not less than 0.20 times, but not more than 0.33 times, more preferably not more than 0.23 times the maximum circumferential length L2 of the shoulder block 21.

In order to assure such improvement, the ratio W2/W1 of the width W2 to the width W1 is preferably set in a range of not less than 1.10, more preferably not less than 1.30, but not more than 1.70, more preferably not more than 1.50.

In order to improve the ice performance and the snow performance in a good balance, the axial length L4 of the second portion 24 is preferably set in a range of not less than 0.32 times, more preferably not less than 0.37 times, but not more than 0.52 times, more preferably not more than 0.47 times the width W9 of the shoulder land zone.

It is preferable that the groove depth D6 of the second portion 24 is more than the groove depth D5 of the first portion 23, and it is preferable that the groove depth D6 of the second portion 24 is not less than 1.40 times, more preferably not less than 1.45 times, but not more than 1.60 times, more preferably not more than 1.55 times the groove depth D5 of the first portion 23 in order to increase the drainage and effectively improve the wet performance.

It is preferable that, as shown in FIG. 3, the shoulder axial groove 20 has a third portion 25 which has a groove width more than the second portion 24, and to which the axially outer end 24o of the second portion 24 is connected in order to improve the wandering performance on dry roads and improve the wet performance.

In this example, the shoulder narrow groove 22 extends straight in the tire circumferential direction with a substantially constant groove width W14.

In this example, each end of the shoulder narrow groove 22 is connected to the junction 28 between the first portion 23 and the second portion 24 of the adjacent shoulder axial groove 20 in order to effectively drain water existing between the shoulder land zone 7 and the road surface and improve the wet performance during running in wet conditions.

There is a possibility that such function and effect can not be obtained if the width W14 of the shoulder narrow groove 22 is small. If the width W14 of the shoulder narrow groove 22 is large, there is a possibility that the rigidity of the shoulder land zone 7 is decreased and steering stability is deteriorated. Therefore, the width W14 of the shoulder narrow groove 22 is preferably set in a range of not less than 0.18 times, more preferably not less than 0.20 times, but not more than 0.26 times, more preferably not more than 0.24 times the width W4 of the shoulder main groove 4.

For similar reasons, the depth D7 of the shoulder narrow groove 22 is preferably set in a range of not less than 0.45 times, more preferably not less than 0.50 times, but not more than 0.60 times, more preferably not more than 0.55 times the depth D2 of the shoulder main groove 4.

Due to the shoulder narrow grooves 22, the shoulder blocks 21 each include an inside block 26 axially inside the shoulder narrow groove 22 and an outside block 27 axially outside the shoulder narrow groove 22.

In this example, the top surface 26s of the inside block 26 is formed in a substantially parallelogram.

The circumferential length L5 of the inside block 26 is preferably set in a range of not less than 0.90 times, more preferably not less than 0.95 times, but not more than 1.1 times, more preferably not more than 1.05 times the width W9 of the shoulder land zone 7 in order to optimize the rigidity of the shoulder land zone 7 and improve the ice performance.

In this example, the top surface 27s of the outside block 27 is formed in a substantially rectangular shape.

The circumferential length L6 of the outside block 27 is preferably set in a range of not less than 0.75 times, more preferably not less than 0.80 times, but not more than 0.95 times, more preferably not more than 0.90 times the circumferential length L5 of the inside block 26 in order to improve the snow performance and the ice performance at the same time and improve the wandering performance.

Preferably, the shoulder blocks 21 are each provided with sipes 31 having a groove width of 0.5 to 1.0 mm in order to improve the ice performance.

In this example, the sipe 31 has an end 29 connected to the shoulder narrow groove 22, and an end 30 terminating within the shoulder block 21.

It is preferable that the sipes 31 are parallel with the edges 21e of the shoulder block 21 in the tire circumferential direction in order to prevent the block from getting chipped and in order that the sipes 31 can exert the edge effect in the same direction as the shoulder axial groove 20 to improve the snow performance and ice performance.

It is preferable that the sipes 31 are arranged at intervals in the tire circumferential direction.

In this example, the inside block 26 and outside block 27 are each provided with four sipes 31.

It is preferable that the sipes 31 are arranged at regular intervals in the tire circumferential direction in order to even the rigidity of the shoulder block 21 and prevent the block from getting chipped.

The middle land zone 6 may be provided with the sipes 31 in order to further improve the snow performance and ice performance.

Figure 4:
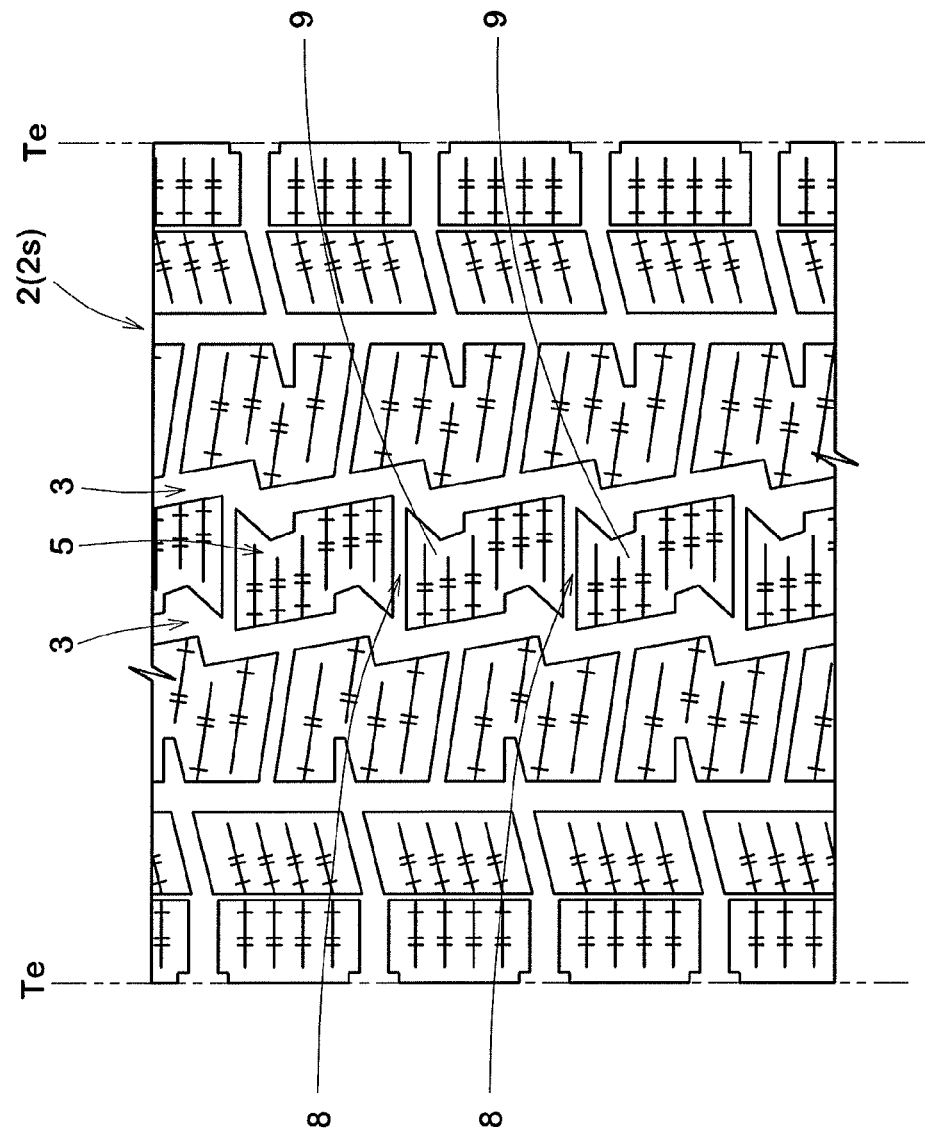
FIG. 4 is a developed partial view of the tread portion of a pneumatic tire as another embodiment of the present invention.

FIG. 4 shows another embodiment of the present invention in which the center land zone 5 is formed as a row of center blocks 9 arranged circumferentially of the tire in order to further improve the snow performance.

The center blocks 9 are circumferentially divided by center axial grooves 8 extending from one of the crown main grooves 3 to the other.

Figure 5:
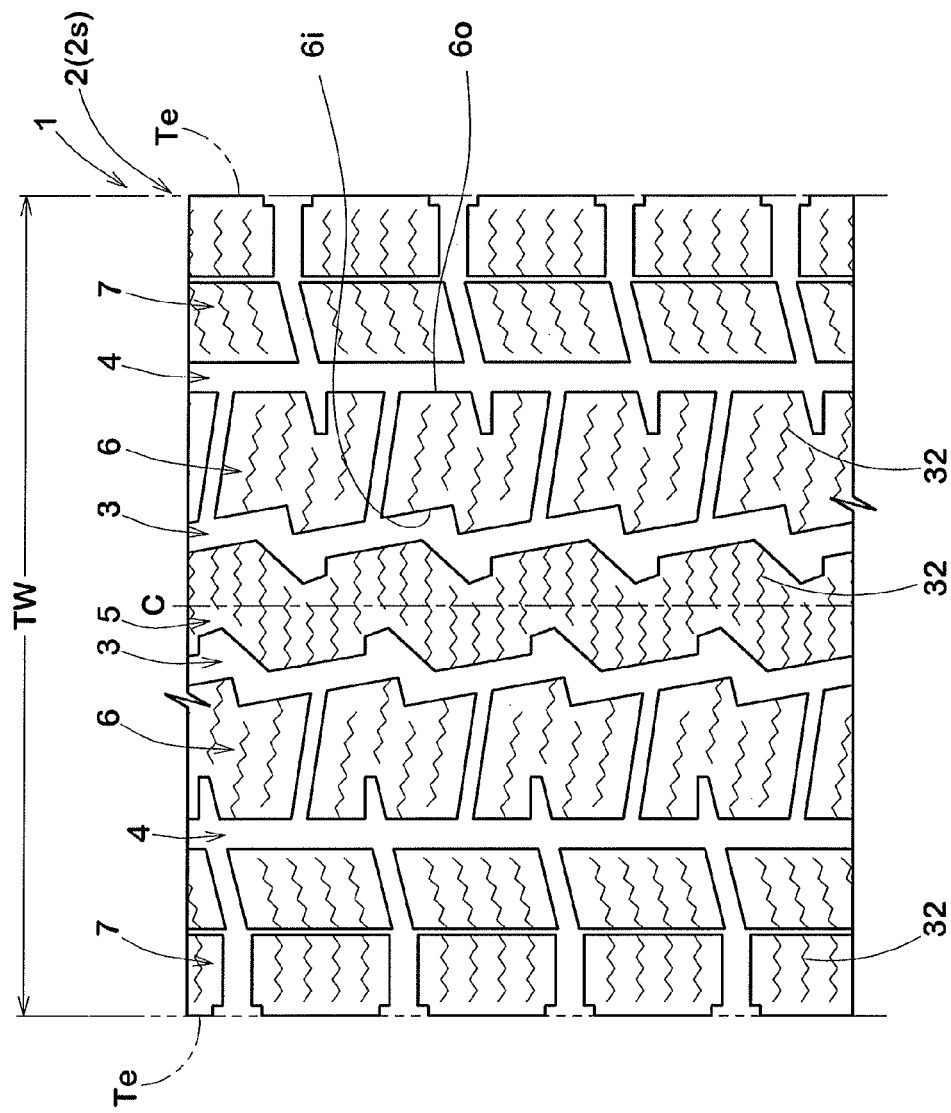
FIG. 5 is a developed partial view of the tread portion of a pneumatic tire as still another embodiment of the present invention.

FIG. 5 shows another embodiment of the present invention in which the center land zone 5, the middle land zones 6 and the shoulder land zones 7 are each provided with zigzag sipes 32 in order that the sipes 32 exert the edge effect in multi-directions to further improve the snow performance.

Comparison Tests

Figure 6:
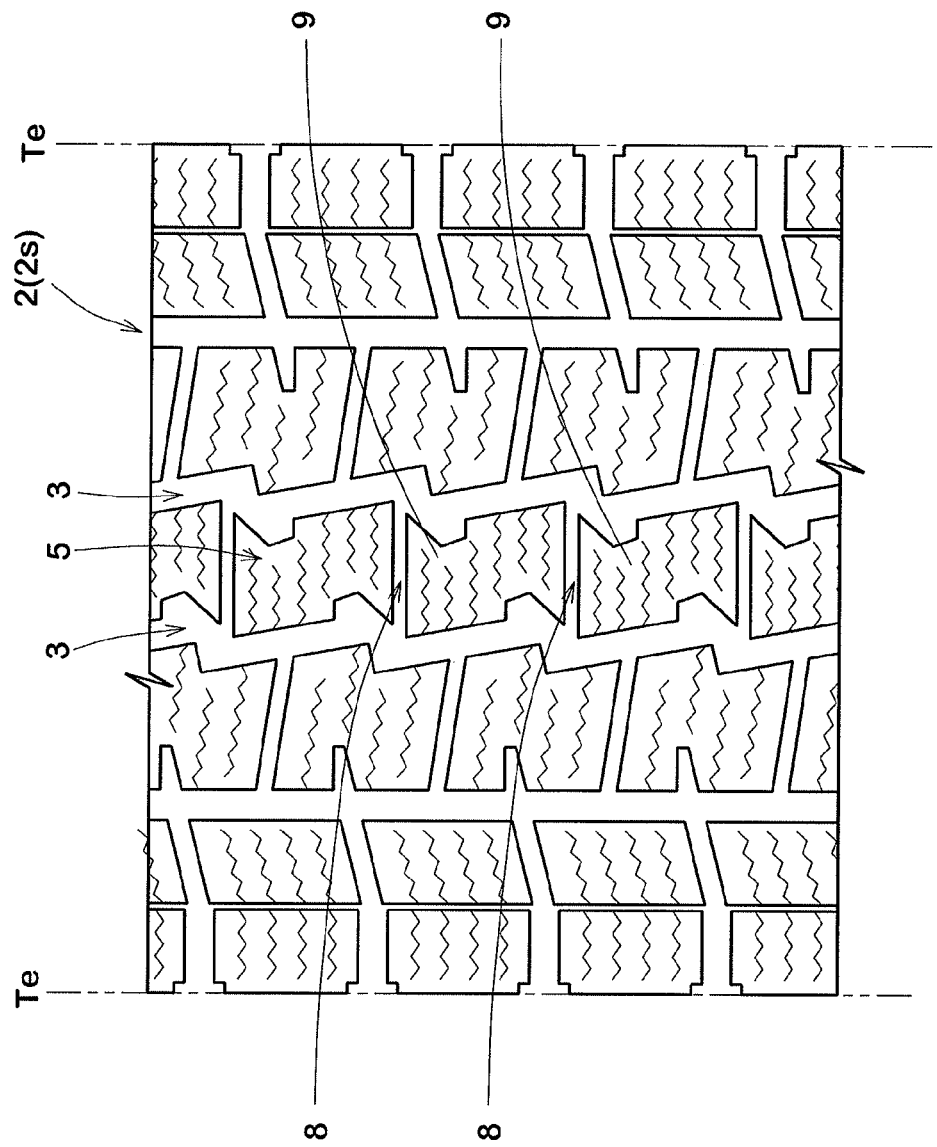
FIG. 6 is a developed partial view of the tread portion of a pneumatic tire as yet still another embodiment of the present invention.

Based on the tread patterns shown in FIG. 1 and FIG. 4, pneumatic tires of size 195/80R15 (rim size 15×6.0 J) having the specifications shown in Table 1 were prepared and tested for the snow performance and ice performance. Based on the tread patterns shown in FIG. 5 and FIG. 6, pneumatic tires of size 195/80R15 having the specifications shown in Table 2 were prepared and tested for the snow performance and ice performance. Specifications common to all of the tires are as follows:

Main grooves:
 depths D1,D2: 12.0 mm
Middle axial grooves:
 depth D3: 8.5 mm
Middle auxiliary grooves:
 depth D4: 6.5 mm
Shoulder axial grooves:
 first portion's depth D5: 6.5 mm
 second portion's depth D6: 10.0 mm
Ice performance test: when a test car was running on an icy road at a speed of 30 km/h, the brake was fully applied, and the braking distance was measured.

Snow performance test: During the test car was running on a snowy road covered with trodden snow, the snow performance (steering responsiveness, braking power, drive power etc.) was evaluated by the test driver.

Test car: 2700 cc four-wheel-drive car (loading 500 kg=50% of maximum loading capacity, front tire pressure=350 kPa, rear tire pressure=425 kPa)

The results are indicated in Table 1 and Table 2 by an index based on Comparative example tire Ref. 1 (in Table 1) and comparative example tire Ref. 1R (in Table 2) being 100. The larger index number is better.

From the test results, it was confirmed that the pneumatic tires according to the present invention can be significantly improved in the snow performance and ice performance.

TABLE 1

| Tire | Ref. 1 | Ref. 2 | Ref. 3 | Ref. 4 | Ref. 5 | Ref. 6 | Ex. 1 | Ex. 2 | Ex. 3 | Ex. 4 | Ex. 5 |
|---|---|---|---|---|---|---|---|---|---|---|---|
| tread pattern (FIG. NO.) | 1 | 4 | 1 | 1 | 1 | 1 | 1 | 1 | 1 | 1 | 1 |
| shoulder axial groove outer end width W11/ inner end width W10 | 1.0 | 1.0 | 1.0 | 1.0 | 1.0 | 1.0 | 2.65 | 2.65 | 2.65 | 2.65 | 2.65 |
| 1st portion width W1/shoulder block max. circum. length L2 | 0.17 | 0.17 | 0.17 | 0.17 | 0.17 | 0.17 | 0.14 | 0.10 | 0.30 | 0.14 | 0.14 |
| 2nd portion width W2/shoulder block max. circum. length L2 | 0.17 | 0.17 | 0.17 | 0.17 | 0.17 | 0.17 | 0.21 | 0.21 | 0.33 | 0.17 | 0.33 |
| 2nd portion width W2/1st portion width W1 | 1.00 | 1.00 | 1.00 | 1.00 | 1.00 | 1.00 | 1.50 | 2.10 | 1.10 | 1.21 | 2.36 |
| 1st portion angle θ3 (deg.) | 15.0 | 0.0 | 0.0 | 5.0 | 25.0 | 35.0 | 15.0 | 15.0 | 15.0 | 15.0 | 15.0 |
| ice performance | 100 | 90 | 98 | 99 | 100 | 98 | 106 | 106 | 102 | 105 | 103 |
| snow performance | 100 | 105 | 100 | 100 | 100 | 100 | 105 | 103 | 107 | 102 | 105 |

| Tire | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| tread pattern (FIG. NO.) | 1 | 1 | 1 | 1 | 1 | 1 | 1 | 4 | 4 | 4 | 4 | 4 |
| shoulder axial groove outer end width W11/inner end width W10 | 2.65 | 2.65 | 2.65 | 2.65 | 2.65 | 2.65 | 2.65 | 2.65 | 2.65 | 2.65 | 2.65 | 2.65 |
| 1st portion width W1/shoulder block max. circum. length L2 | 0.10 | 0.10 | 0.14 | 0.14 | 0.17 | 0.17 | 0.17 | 0.14 | 0.10 | 0.30 | 0.14 | 0.14 |
| 2nd portion width W2/shoulder block max. circum. length L2 | 0.14 | 0.17 | 0.19 | 0.23 | 0.19 | 0.23 | 0.29 | 0.21 | 0.21 | 0.33 | 0.17 | 0.33 |
| 2nd portion width W2/1st portion width W1 | 1.40 | 1.70 | 1.36 | 1.64 | 1.12 | 1.35 | 1.71 | 1.50 | 2.10 | 1.10 | 1.21 | 2.36 |
| 1st portion angle θ3 (deg.) | 15.0 | 15.0 | 15.0 | 15.0 | 15.0 | 15.0 | 15.0 | 15.0 | 15.0 | 15.0 | 15.0 | 15.0 |
| ice performance | 105 | 105 | 105 | 105 | 100 | 100 | 95 | 102 | 102 | 99 | 101 | 100 |
| snow performance | 95 | 100 | 102 | 105 | 102 | 105 | 108 | 108 | 104 | 108 | 104 | 107 |

TABLE 2

| Tire | Ref. 1R | Ref. 2R | Ref. 3R | Ref. 4R | Ref. 5R | Ref. 6R | Ex. 1R | Ex. 2R | Ex. 3R | Ex. 4R | Ex. 5R |
|---|---|---|---|---|---|---|---|---|---|---|---|
| tread pattern (FIG. NO.) | 5 | 6 | 5 | 5 | 5 | 5 | 5 | 5 | 5 | 5 | 5 |
| shoulder axial groove outer end width W11/inner end width W10 | 1.0 | 1.0 | 1.0 | 1.0 | 1.0 | 1.0 | 2.65 | 2.65 | 2.65 | 2.65 | 2.65 |
| 1st portion width W1/shoulder block max. circum. length L2 | 0.17 | 0.17 | 0.17 | 0.17 | 0.17 | 0.17 | 0.14 | 0.10 | 0.30 | 0.14 | 0.14 |
| 2nd portion width W2/shoulder block max. circum. length L2 | 0.17 | 0.17 | 0.17 | 0.17 | 0.17 | 0.17 | 0.21 | 0.21 | 0.33 | 0.17 | 0.33 |
| 2nd portion width W2/ 1st portion width W1 | 1.00 | 1.00 | 1.00 | 1.00 | 1.00 | 1.00 | 1.50 | 2.10 | 1.10 | 1.21 | 2.36 |
| 1st portion angle θ3 (deg.) | 15.0 | 0.0 | 0.0 | 5.0 | 25.0 | 35.0 | 15.0 | 15.0 | 15.0 | 15.0 | 15.0 |
| ice performance | 100 | 89 | 97 | 98 | 100 | 97 | 107 | 106 | 103 | 105 | 104 |
| snow performance | 100 | 106 | 100 | 100 | 100 | 100 | 106 | 104 | 107 | 101 | 105 |

| Tire | Ex. 6R | Ex. 7R | Ex. 8R | Ex. 9R | Ex. 10R | Ex. 11R | Ex. 12R | Ex. 13R | Ex. 14R | Ex. 15R | Ex. 16R | Ex. 17R |
|---|---|---|---|---|---|---|---|---|---|---|---|---|
| tread pattern (FIG. NO.) | 5 | 5 | 5 | 5 | 5 | 5 | 5 | 6 | 6 | 6 | 6 | 6 |
| shoulder axial groove outer end width W11/inner end width W10 | 2.65 | 2.65 | 2.65 | 2.65 | 2.65 | 2.65 | 2.65 | 2.65 | 2.65 | 2.65 | 2.65 | 2.65 |
| 1st portion width W1/shoulder block max. circum. length L2 | 0.10 | 0.10 | 0.14 | 0.14 | 0.17 | 0.17 | 0.17 | 0.14 | 0.10 | 0.30 | 0.14 | 0.14 |
| 2nd portion width W2/shoulder block max. circum. length L2 | 0.14 | 0.17 | 0.19 | 0.23 | 0.19 | 0.23 | 0.29 | 0.21 | 0.21 | 0.33 | 0.17 | 0.33 |
| 2nd portion width W2/ 1st portion width W1 | 1.40 | 1.70 | 1.36 | 1.64 | 1.12 | 1.35 | 1.71 | 1.50 | 2.10 | 1.10 | 1.21 | 2.36 |
| 1st portion angle θ3 (deg.) | 15.0 | 15.0 | 15.0 | 15.0 | 15.0 | 15.0 | 15.0 | 15.0 | 15.0 | 15.0 | 15.0 | 15.0 |

TABLE 2-continued

| | | | | | | | | | | | | |
|---|---|---|---|---|---|---|---|---|---|---|---|---|
| ice performance | 106 | 106 | 106 | 106 | 100 | 100 | 97 | 103 | 103 | 99 | 102 | 100 |
| snow performance | 96 | 100 | 101 | 104 | 103 | 105 | 108 | 107 | 105 | 110 | 104 | 106 |

The invention claimed is:

1. A pneumatic tire comprising
a tread portion provided on each side of the tire equator with a crown main groove and a shoulder main groove extending continuously in the tire circumferential direction, so that the tread portion is axially divided into a center land zone between the crown main grooves, a pair of middle land zones between the crown main grooves and the shoulder main grooves, and a pair of shoulder land zones axially outside the shoulder main grooves, wherein
the middle land zones are each provided with a plurality of middle auxiliary grooves extending axially inwardly from the shoulder main groove and terminating within the middle land zone,
the shoulder land zones are each provided with a plurality of shoulder axial grooves extending axially outwardly from the shoulder main groove,
the width of the shoulder axial groove measured at the axially outer end is larger than the width of the shoulder axial groove measured at the axially inner end, and
the axially inner ends of the shoulder axial grooves are respectively overlapped with the axially outer ends of the middle auxiliary grooves at least partially in the tire circumferential direction, wherein
each of the shoulder axial grooves comprises
a first portion extending axially outwardly from the shoulder main groove and having a constant groove width,
a second portion extending axially outwardly from the first portion and having a constant groove width more than the groove width of the first portion, and
a third portion extending axially outwardly from the second portion to the tread edge and having a groove width more than the groove width of the second portion,
wherein
the second portions extend substantially parallel with the tire axial direction, and
the first portions extend straight at an inclination angle of not less than 5 degrees and not more than 25 degrees with respect to the tire axial direction,
wherein
the shoulder land zones each have a constant axial width,
the first portions have an axial length of not less than 0.40 times the axial width of the shoulder land zone,
the second portions have an axial length of not less than 0.32 times the axial width of the shoulder land zone,
the first portions have a depth, and
the second portions have a depth more than the depth of the first portions.

2. The pneumatic tire according to claim 1, wherein
each of the shoulder land zones comprises shoulder blocks divided by the shoulder axial grooves,
the groove width W1 of the first portion is 0.10 to 0.30 times the maximum circumferential length of the shoulder block, and
the groove width W2 of the second portion is 0.17 to 0.33 times the maximum circumferential length of the shoulder block.

3. The pneumatic tire according to claim 2, wherein
the ratio W2/W1 of the groove width W2 of the second portion to the groove width W1 of the first portion is in a range of not less than 1.10, but not more than 1.70.

4. The pneumatic tire according to claim 1, wherein
each of the shoulder land zones is provided with a plurality of shoulder narrow grooves each extending from the junction between the first portion and the second portion of one of the shoulder narrow grooves to the junction of the adjacent shoulder narrow groove with a groove width less than the shoulder main groove.

5. The pneumatic tire according to claim 2, wherein
each of the shoulder land zones is provided with a plurality of shoulder narrow grooves each extending from the junction between the first portion and the second portion of one of the shoulder narrow grooves to the junction of the adjacent shoulder narrow groove with a groove width less than the shoulder main groove.

6. The pneumatic tire according to claim 3, wherein
each of the shoulder land zones is provided with a plurality of shoulder narrow grooves each extending from the junction between the first portion and the second portion of one of the shoulder narrow grooves to the junction of the adjacent shoulder narrow groove with a groove width less than the shoulder main groove.

7. The pneumatic tire according to claim 1, wherein
the depth of the second portions is not less than 1.40 times and not more than 1.60 times the depth of the first portions.

8. The pneumatic tire according to claim 1, wherein
the axial width of the shoulder land zones is in a range of from 0.13 times to 0.20 times the width of the tread portion.

* * * * *